United States Patent
Sano

(10) Patent No.: US 10,210,357 B2
(45) Date of Patent: Feb. 19, 2019

(54) WIRELESS TAG COMMUNICATION APPARATUS, WIRELESS TAG COMMUNICATION SYSTEM, AND COMMUNICATION METHOD

(71) Applicant: TOSHIBA TEC KABUSHIKI KAISHA, Tokyo (JP)

(72) Inventor: Kouichi Sano, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/447,271

(22) Filed: Mar. 2, 2017

(65) Prior Publication Data

US 2017/0293781 A1 Oct. 12, 2017

(30) Foreign Application Priority Data

Apr. 6, 2016 (JP) .................. 2016-076752

(51) Int. Cl.
*G06K 7/10* (2006.01)
*G06K 7/00* (2006.01)

(52) U.S. Cl.
CPC ....... *G06K 7/10366* (2013.01); *G06K 7/0008* (2013.01); *G06K 7/10029* (2013.01); *G06K 7/10217* (2013.01)

(58) Field of Classification Search
CPC ...... G06F 19/322; G06F 19/323; G06F 21/32; G06F 2221/2111; G06F 2221/2129; G06F 19/00; G06K 2017/0051; G06K 7/0008; G06K 7/10079; G06K 7/10336; G06K 7/10356; G06K 7/10027; G06K 7/10217; G06K 7/10029; G16H 10/60; G16H 10/65; H04L 63/06; H04L 63/0853; H04L 63/0861; H04W 12/04; H04W 12/06; G01S 11/06; G01S 5/14; G06Q 10/087
See application file for complete search history.

(56) References Cited

U.S. PATENT DOCUMENTS

2009/0195358 A1\* 8/2009 Vennelakanti ....... G06K 7/0008
340/10.1
2010/0321166 A1 12/2010 Horst et al.
(Continued)

FOREIGN PATENT DOCUMENTS

JP 2007-205754 8/2007

OTHER PUBLICATIONS

EESR, Application No. 17162026.3, Toshiba TEC Kabushiki Kaisha, Sep. 20, 2017.

*Primary Examiner* — Dionne H Pendleton
(74) *Attorney, Agent, or Firm* — Kim & Stewart LLP

(57) ABSTRACT

According to one embodiment, a wireless tag communication apparatus includes a plurality of communication units configured to communicate with a wireless tag. The communication units are disposed such that communicable ranges of the communication units overlap each other. A control unit controls each of the plurality of communication units to alternate between a communication state and a pause state. When the wireless tag is positioned within communication ranges of both first and second communication units of the plurality of communication units, the control unit controls the first communication unit to be in the communication state and the second communication unit to be in the pause state.

18 Claims, 14 Drawing Sheets

(56) References Cited

U.S. PATENT DOCUMENTS

| | | | |
|---|---|---|---|
| 2011/0156870 A1* | 6/2011 | Attew | G01S 5/14 340/10.1 |
| 2011/0199211 A1 | 8/2011 | Campero et al. | |
| 2014/0148095 A1 | 5/2014 | Smith et al. | |
| 2018/0019998 A1* | 1/2018 | Giobbi | H04W 12/06 |

* cited by examiner

WIRELESS TAG COMMUNICATION APPARATUS, WIRELESS TAG COMMUNICATION SYSTEM, AND COMMUNICATION METHOD

CROSS-REFERENCE TO RELATED APPLICATION

This application is based upon and claims the benefit of priority from Japanese Patent Application No. 2016-076752 filed Apr. 6, 2016, the entire contents of which are incorporated herein by reference.

FIELD

Embodiments described herein relate generally to a technique for communicating with wireless tags.

BACKGROUND

Wireless tags that store identification information are widely used. Wireless tags are attached to products such as merchandise or equipment and also to buildings and around roads. In the wireless tag, a radio frequency identifier (RFID) tag is included that stores ID information or the like and that performs a wireless communication within a near distance of several centimeters to several meters. When a communication device (reader and writer) reads the RFID tag, merchandise information or positional information can be acquired from information associated with the read tag ID.

DETAILED DESCRIPTION

Figure 1:
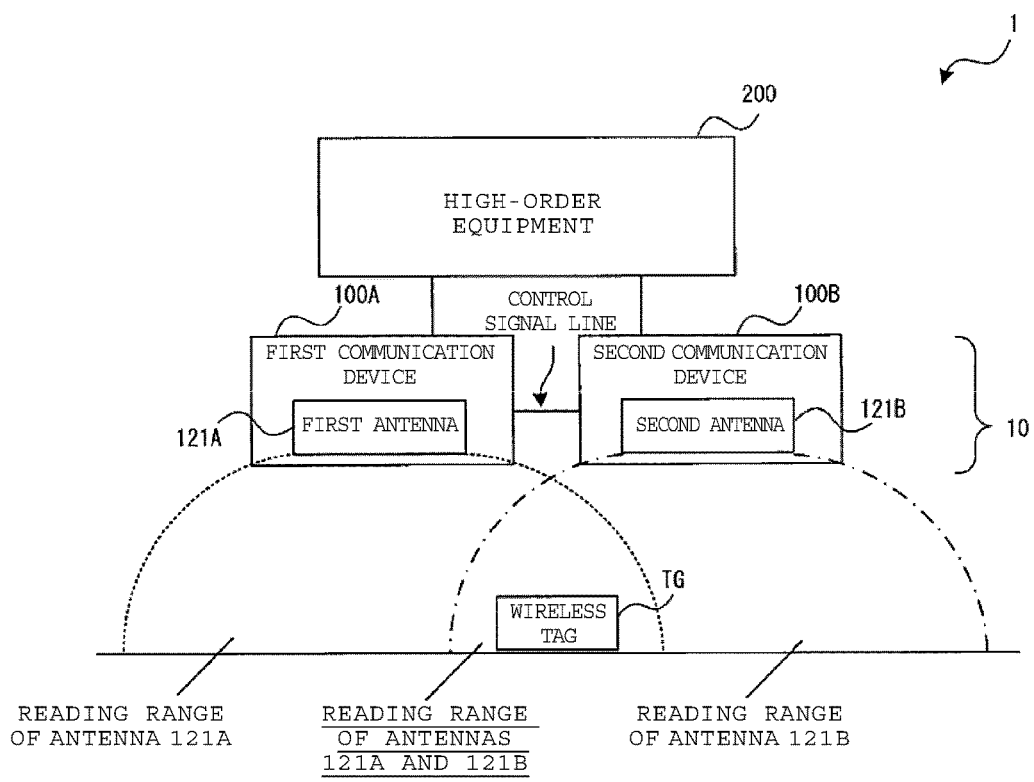
FIG. 1 is a diagram illustrating a wireless tag communication system according to a first embodiment.

In a UHF band wireless tag communication system, a specific low-power wireless tag communication apparatus can be used outdoors without a license acquisition or registration procedure. However, the specific low-power wireless tag communication apparatus has restrictions, such as the necessity of pausing (stopping) radio wave transmission for a minimum of 50 ms after the radio wave is transmitted for a maximum of 4 seconds.

In addition, in some embodiments the wireless tag is read using a plurality of communication devices that communicate with the wireless tag when the wireless tag is within a reading range of the respective communication device. In this case, the communication devices are disposed such that the reading ranges of the communication devices overlap.

However, with a plurality of communication devices, the timing of the radio wave transmission pause (for example, for the above-described 50 ms) of one communication device and the timing of the radio wave transmission pause of the other communication device overlap, creating a time period where none of the communication devices can read the wireless tag.

When the wireless tags stand still in the same position, the wireless tags can be read after returning from the pause state. However, when the wireless tag or the communication device moves, and the pause times of the communication devices overlap, the wireless tag can move out of the reading range and data of the wireless tag cannot be obtained.

Embodiments provide a technique capable of improving the reliability of communication with the wireless tag.

According to one embodiment, a wireless tag communication apparatus includes a plurality of communication units configured to communicate with a wireless tag. The communication units are disposed such that communicable ranges of the communication units overlap each other. A control unit controls each of the plurality of communication units to alternate between a communication state and a pause state. When the wireless tag is positioned within communication ranges of both first and second communication units of the plurality of communication units, the control unit controls the first communication unit to be in the communication state and the second communication unit to be in the pause state.

In addition, a wireless tag communication system of the embodiment includes a plurality of communication units, a control unit, and a wireless tag. The plurality of communication units are disposed on a moving object and disposed such that communicable ranges of the communication units overlap each other. The plurality of communication units each communicate with a wireless tag. The control unit controls each of the plurality of communication units to alternate between a communication state and a pause state. When the wireless tag is positioned within the communication ranges of both first and second communication units of the plurality of communication units, the control unit controls the first communication unit to be in the communication state and the second communication unit to be in the pause state. The plurality of wireless tags are disposed along a traveling direction of the moving object.

According to one embodiment, a method of communicating between a wireless tag and a plurality of communication units disposed such that communicable ranges of the communication units overlap each other includes alternating each of the plurality of communication units between a communication state and a pause state. When the wireless tag is positioned within communication ranges of both first and second communication units of the plurality of communication units, the method includes controlling the first communication unit to be in the communication state and the second communication unit to be in the pause state.

Hereinafter, the wireless tag communication apparatus, the wireless tag communication system, and a communication method of the embodiment will be described with reference to drawings.

First Embodiment

FIG. 1 is a diagram illustrating a wireless tag communication system according to a first embodiment. A wireless tag communication system 1 includes a first communication device 100A (communication unit), a second communication device 100B (communication unit), high-order equipment 200, and a plurality of wireless tags TG.

The first communication device 100A and second communication device 100B are capable of data communication with the high-order equipment 200. The first communication device 100A and the second communication device 100B transmit the data received from the wireless tag TG to the high-order equipment 200. In addition, the first communication device 100A and the second communication device 100B input and output signals to and from each other via a control signal line.

The first communication device 100A includes a first antenna 121A that transmits and receives UHF band radio waves and reads data of the wireless tag TG positioned within the range indicated by a dotted line in FIG. 1. Similarly, the second communication device 100B includes a second antenna 121B that transmits and receives UHF band radio waves and reads data of the wireless tag TG positioned within the range indicated by a dotted-and-dashed line in FIG. 1. As illustrated in FIG. 1, the first communication device 100A and the second communication device 100B are disposed such that a part of their respective reading ranges overlaps.

The first communication device 100A and the second communication device 100B repeat reading and pause operations synchronously with each other such that when one of the first communication device 100A and the second communication device 100B is in a pause state, the other performs a reading operation. When one of the first communication device 100A and the second communication device 100B is in a reading operation, the other is in the pause state. This synchronization is performed by inputting and outputting a signal via the control signal line.

The wireless tag TG is a radio frequency identifier (RFID) tag and is positioned in an overlapping range within the reading range of the first antenna 121A and the second antenna 121B. That is, the data of the wireless tag TG can be read from both the first antenna 121A and the second antenna 121B.

A configuration in which the first communication device 100A and the second communication device 100B are included and each device is connected to the control signal line is referred to as a wireless tag communication apparatus 10. In addition, the wireless tag communication system 1 may not include the plurality of wireless tags TG in some embodiments.

Figure 2A:
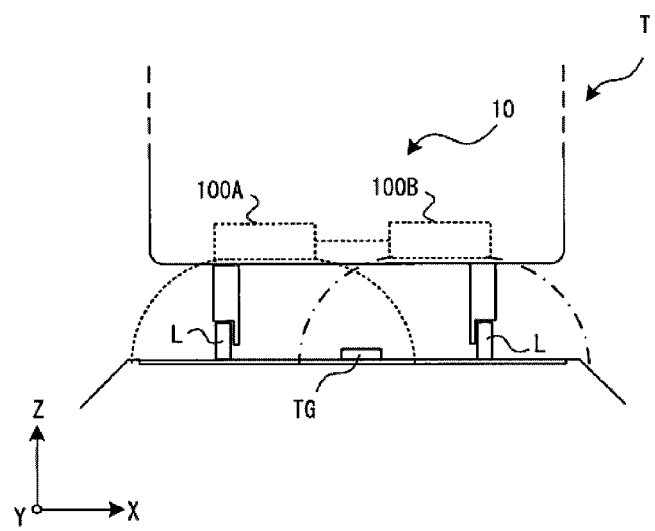
FIGS. 2A and 2B are diagrams illustrating first and second communication devices disposed on a moving object and a wireless tag disposed on a road surface.
Figure 2B:
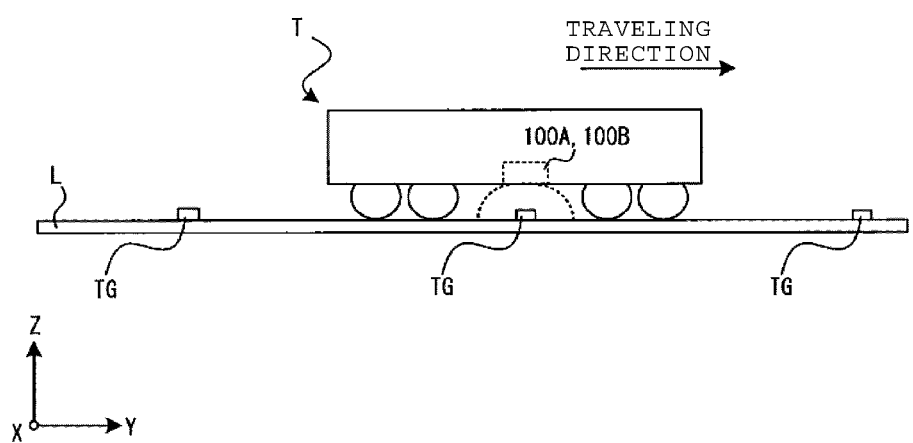

FIGS. 2A and 2B are diagrams illustrating that two communication devices 100A and 100B are disposed on a moving object and the wireless tag is disposed on a road surface that the moving object passes. Hereinafter, when collectively referring to the first communication device 100A and the second communication device 100B, the first communication device 100A and the second communication device 100B are referred to as "communication devices 100A and 100B" as necessary. FIG. 2A is a diagram viewed from a front surface of a moving object T in a traveling direction and FIG. 2B is a diagram viewed from a side surface of the moving object T in the traveling direction. For example, the moving object T is a self-traveling vehicle that is driven and moved by a driver's operation, such as a train traveling on a rail L. The wireless tag TG is disposed between two rails L as illustrated in FIG. 2A and can be read from both the communication devices 100A and 100B. In addition, a plurality of the wireless tags TG are disposed along the rail L as illustrated in FIG. 2B. The disposing locations of the wireless tags TG can be at any suitable locations, such as, for example, at regular intervals, signals, branching points, or the like.

Each of the wireless tags TG stores a tag ID that comprises identification information of the tag itself. When one wireless tag TG is in the reading range of communication devices 100A and 100B on moving object T, the wireless tag TG is activated to output its own tag ID to the communication devices 100A and 100B wirelessly. The communication devices 100A and 100B then output the read tag ID to the high-order equipment 200. By acquiring positional information which is correlated with the tag ID, the high-order equipment 200 can determine that the moving object T passed through a specific location. The moving object T then continuously travels and reaches the reading range of other wireless tags TG, and the operation is repeatedly performed.

In such a configuration, in which a plurality of communication devices are disposed on the moving object and read the wireless tag while moving, when the timing of a radio wave transmission pause of each communication device overlaps and the moving object moves outside the reading range during the pause, the ID of the wireless tag cannot be obtained.

In addition, when radio communication signals from a plurality of communication devices overlap, radio wave interference or the like may occur. When the radio communication signals from the plurality of communication devices are simultaneously outputted, there is a case where it is uncertain which communication device read the tag ID.

In the first embodiment, by establishing the synchronization with the communication devices 100A and 100B, when one device is in the pause state, the other device performs a reading operation, and conversely, while one device performs the reading operation, the other device is in the pause state.

In FIGS. 2A and 2B, the moving object T is a train vehicle and has a configuration that the wireless tag is provided on a rail track. However, according to another aspect, the moving object may be an automobile and the wireless tag may be provided along the road. In another embodiment, positions of the communication devices 100A and 100B may be fixed and products such as merchandise or equipment with the wireless tag may be placed on a belt and passed through the communication devices 100A and 100B. Alternatively, a gate including the communication devices 100A and 100B may be provided on a door of a store or the like and the product may be prevented from being taken out without permission.

In such an embodiment, a relative speed is provided between the communication devices 100A and 100B and the wireless tag TG, and the wireless tag TG entering the reading range is read by the communication devices 100A and 100B. Here, one of the communication devices 100A and 100B moves or the wireless tags TG moves. However, both may move. Alternatively, even in a state where both the communication devices 100A and 100B and the wireless tag TG are fixed, embodiments described herein can be applied.

Figure 3:
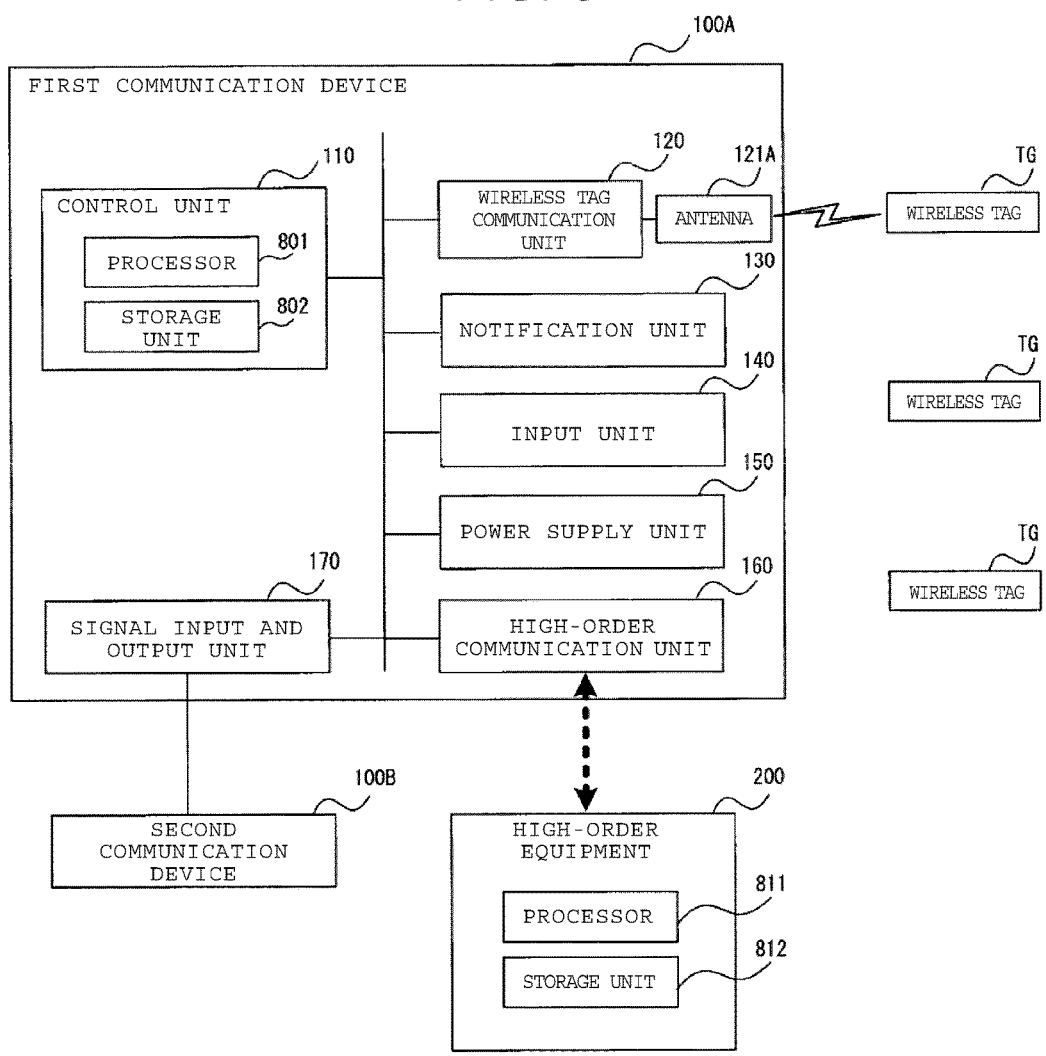
FIG. 3 is a diagram illustrating a configuration example of the first communication device.

FIG. 3 is a block diagram illustrating a wireless tag communication system 1 according to an embodiment. In FIG. 3, the internal configuration of the first communication device 100A is illustrated. However, while not illustrated in detail, the configuration of the second communication device 100B is the same as that of the first communication device 100A. The first communication device 100A includes a notification unit 130 and an input unit 140. The notification unit 130 includes a display or a buzzer, notifies a user of a situation, and provides a screen for setting. The input unit 140 is a portion operated by the user and may be a physical button or a touch panel disposed on the display of the notification unit 130.

The first communication device 100A includes a power supply unit 150 for controlling power supplied to the device and also includes a high-order communication unit 160 for communicating with the high-order equipment 200. The power supply unit 150 may be formed of a battery and a control circuit for controlling charging and discharging of the battery and may be configured to receive power from the above-described moving object T.

The first communication device 100A includes a wireless tag communication unit 120. The wireless tag communication unit 120 is connected to the first antenna 121A and receives the tag ID stored on a storage unit of the wireless tag by communicating with the wireless tag TG. The wireless tag communication unit 120 is described in detail below.

The first communication device 100A includes a control unit 110. The control unit 110 comprises a processor 801 that is an arithmetic processing device such as a central processing unit (CPU). The control unit 110 controls the notification unit 130, the input unit 140, the power supply unit 150, the high-order communication unit 160, the wireless tag communication unit 120, and a signal input and output unit 170 described in detail below.

The control unit 110 includes a storage unit 802 which is configured with a read only memory (ROM) and a random access memory (RAM). A program to be used by the control unit 110 or setting data is stored in the ROM in advance. Variable data is temporarily written in the RAM by the operation of the control unit 110. The RAM stores reading information including the identification information which is received by the wireless tag communication unit 120. A part or all of the control functions of the control unit 110 may be implemented by a circuit such as an application specific integrated circuit (ASIC).

The first communication device 100A includes the signal input and output unit 170. The signal input and output unit 170 is connected to the signal input and an output unit 170 of the second communication device 100B via the control signal line and outputs a signal at a high level and a low level. Switching between the high level and the low level is performed according to the instruction from the control unit 110. In the present embodiment, the first communication device 100A only outputs the signal and second communication device 100B only inputs the signal. However, both the devices may input and output the signal by bundling a plurality of wiring or the like.

The high-order equipment 200 is a computer including at least a processor 811 and a storage unit 812. In this embodiment, the high-order equipment 200 sends an operation start instruction and an operation stop instruction to the communication devices 100A and 100B. In addition, the high-order equipment 200 acquires data (such as positional information) from a database which is correlated with a tag ID obtained from the wireless tag TG and performs processing or the like. In addition, the high-order equipment 200 may store the data obtained from the wireless tag TG in the database in correlation with a current time or the like. The communication between the high-order equipment 200 and the high-order communication unit 160 is performed using a protocol that is used in the related art regardless of whether the communication is performed in a wired manner or a wireless manner. The high-order equipment 200 may be loaded on the above-described moving object T and may be disposed externally. A part of the operations of the high-order equipment 200 may be performed by the other external server.

Figure 4:
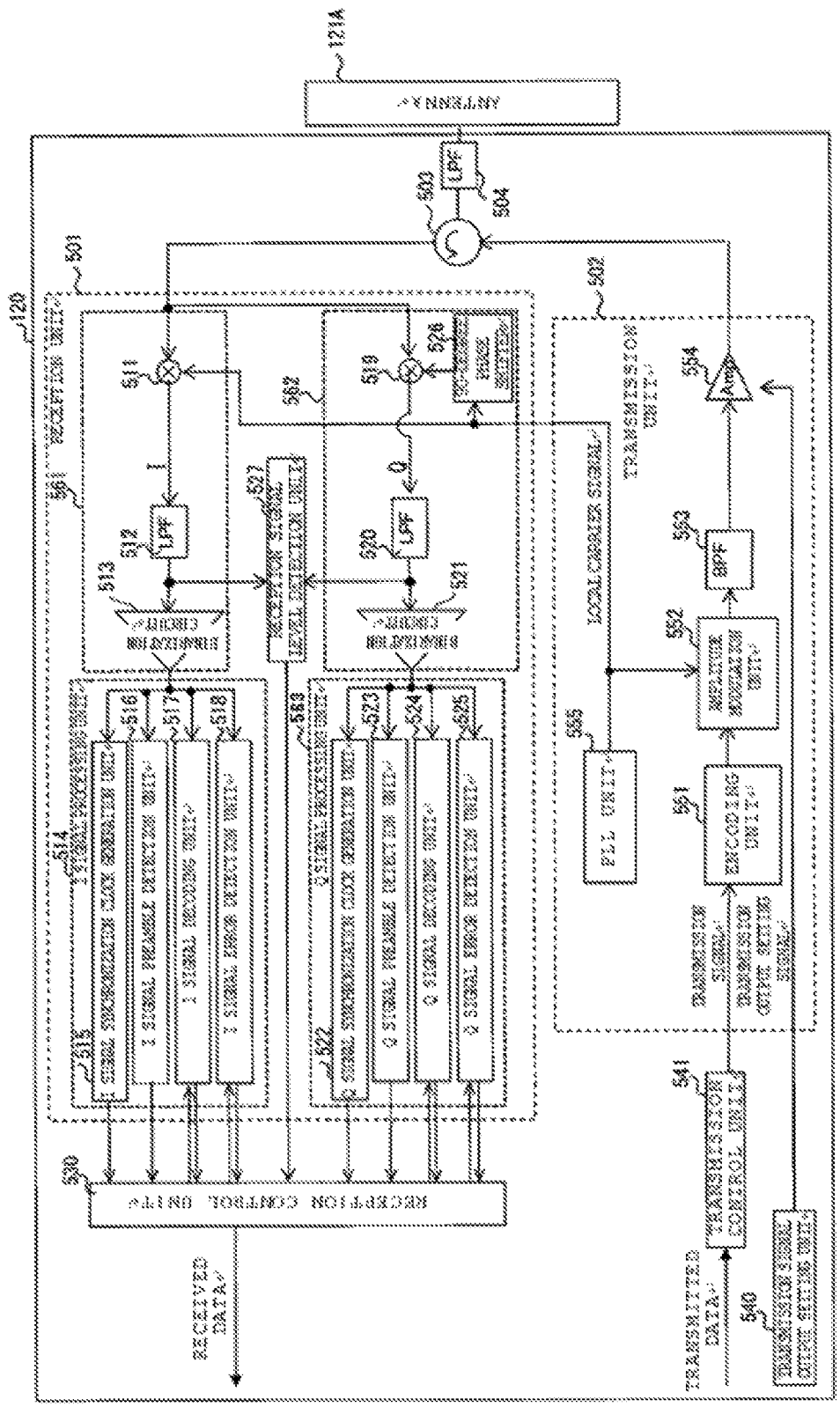
FIG. 4 is a diagram illustrating a wireless tag communication unit in the first communication device.

FIG. 4 is a block diagram illustrating a detailed configuration of the wireless tag communication unit 120. The wireless tag communication unit 120 includes a transmission unit 502 that transmits data to the wireless tag TG, a reception unit 501 that receives the data from the wireless tag TG, a directional coupler 503 such as a circulator, and a low-pass filter (LPF) 504. The directional coupler 503 is connected to the transmission unit 502, the reception unit 501, and the low-pass filter 504 and connected to an antenna 121 (in a case of the first communication device 100A, the first antenna 121A) via the low-pass filter 504.

The transmission unit 502 includes an encoding unit 551, a phase locked loop (PLL) unit 555, an amplitude modulation unit 552, a band pass filter (BPF) 553, and a power amplifier (Amp) 554.

The encoding unit 551 encodes a transmission signal which is output from a transmission control unit 541. The PLL unit 555 provides a local carrier signal to the amplitude modulation unit 552. The amplitude modulation unit 552 amplitude-modulates the local carrier signal from the PLL unit 555 with the transmission signal encoded by the encoding unit 551. The band pass filter 553 removes an unnecessary component from the transmission signal which is amplitude-modulated by the amplitude modulation unit 552. The power amplifier 554 amplifies the transmission signal passed through the band pass filter 553 with an amplification rate in accordance with a transmission output setting signal from a transmission signal output setting unit 540. By amplifying the transmission signal, the transmission output is varied. The transmission signal amplified by the power amplifier 554 is supplied to the directional coupler 503.

The directional coupler 503 supplies the transmission signal from the transmission unit 502 to the antenna 121 through the low-pass filter 504. The transmission signal supplied to the antenna 121 is radiated from the antenna 121 as a radio wave.

When the radio wave radiated from the antenna 121 is received by the wireless tag TG, the wireless tag TG is activated. The activated wireless tag TG wirelessly transmits the information which is stored in an internal memory of the wireless tag TG to the first communication device 100A by performing back scattering modulation on a non-modulated signal. The wireless signal from the wireless tag TG is received by the antenna 121.

When the antenna 121 receives the wireless signal from the wireless tag TG, the reception signal is supplied to the directional coupler 503 from the antenna 121 through the low-pass filter 504. The directional coupler 503 supplies the reception signal of the antenna 121, that is, a signal from the wireless tag TG to the reception unit 501.

The reception unit 501 includes an I signal generation unit 561, a Q signal generation unit 562, an I signal processing unit 514, a Q signal processing unit 563, and a reception signal level detection unit 527.

The I signal generation unit 561 is configured with a first mixer 511, a low pass filter 512, and a binarization circuit 513. The Q signal generation unit 562 is configured with a second mixer 519, a low pass filter 520, a binarization circuit 521, and a 90-degree phase shifter 526.

The reception unit 501 inputs the reception signal from the directional coupler 503 to the first mixer 511 and the second mixer 519, respectively. In addition, the reception unit 501 inputs the local carrier signal from the PLL unit 555 to the first mixer 511 and the 90-degree phase shifter 526. The 90-degree phase shifter 526 shifts the phase of the local carrier signal by 90 degrees and supplies the shifted phase to the second mixer 519.

The first mixer 511 mixes the reception signal and the local carrier signal to generate an I signal having the same phase component as that of the local carrier signal. The I signal is supplied to the binarization circuit 513 through the low pass filter 512. The low pass filter 512 removes the unnecessary high frequency component from the I signal to extract the encoded data component. The binarization circuit 513 binarizes the signal passed through the low pass filter 512.

The second mixer 519 mixes the reception signal and the local carrier signal in which the phase is shifted by 90 degrees to generate a Q signal having a component orthogonal to the local carrier signal. The Q signal is supplied to the binarization circuit 521 through the low pass filter 520. The low pass filter 520 removes the unnecessary high frequency component from the Q signal to extract the encoded data component. The binarization circuit 521 binarizes the signal passed through the low pass filter 520.

The I signal processing unit 514 includes an I signal synchronization clock generation unit 515, an I signal preamble detection unit 516, an I signal decoding unit 517, and an I signal error detection unit 518. The Q signal processing unit 563 includes a Q signal synchronization clock generation unit 522, a Q signal preamble detection unit 523, a Q signal decoding unit 524, and a Q signal error detection unit 525.

The reception unit 501 supplies the I signal binarized by the binarization circuit 513 of the I signal generation unit 561 to the I signal processing unit 514. In addition, the Q signal generation unit 562 supplies the Q signal binarized by the binarization circuit 521 to the Q signal processing unit 563. Here, the I signal processing unit 514 and the Q signal processing unit 563 have the same operation. Therefore, the I signal processing unit 514 will be described in below and the description of the Q signal processing unit 563 will be omitted.

The I signal synchronization clock generation unit 515 usually generates the clock signal synchronized with the binary signal from the binarization circuit 513 and supplies the generated clock signal to a reception control unit 530, the I signal preamble detection unit 516, the I signal decoding unit 517, and the I signal error detection unit 518.

The I signal preamble detection unit 516 detects a preamble attached to the head of the I signal based on the clock signal from the I signal synchronization clock generation unit 515. When the preamble is detected, the I signal preamble detection unit 516 outputs the detection signal to the reception control unit 530. When the preamble detection signal is received, the reception control unit 530 supplies a decoding start request signal to the I signal decoding unit 517. The I signal decoding unit 517 samples the binary signal from the binarization circuit 513 in synchronization with the clock signal from the I signal synchronization clock generation unit 515. When the decoding start request is received from the reception control unit 530, the sampled binary signal is decoded. The decoded data is supplied to the reception control unit 530.

The reception control unit 530 supplies the decoded data to the I signal error detection unit 518. The I signal error detection unit 518 detects the presence or absence of an error from a check code of the decoded data. The I signal error detection unit 518 supplies the data indicating the detection result to the reception control unit 530. Where there is no error in at least one of the I signal and the Q signal, the reception control unit 530 determines that the data is correctly received. The received data which is correctly received is stored in the storage unit 802 as reading information according to the control of the control unit 110.

The reception signal level detection unit 527 detects the amplitude of the I signal passed through the low pass filter 512 and the amplitude of the Q signal passed through the low pass filter 520, respectively. A value of the greater amplitude is notified to the reception control unit 530 as a reception signal level. Alternatively, the value ($\sqrt{I2+Q2}$) obtained by vector synthesis may be notified as the reception signal level.

Figure 5:
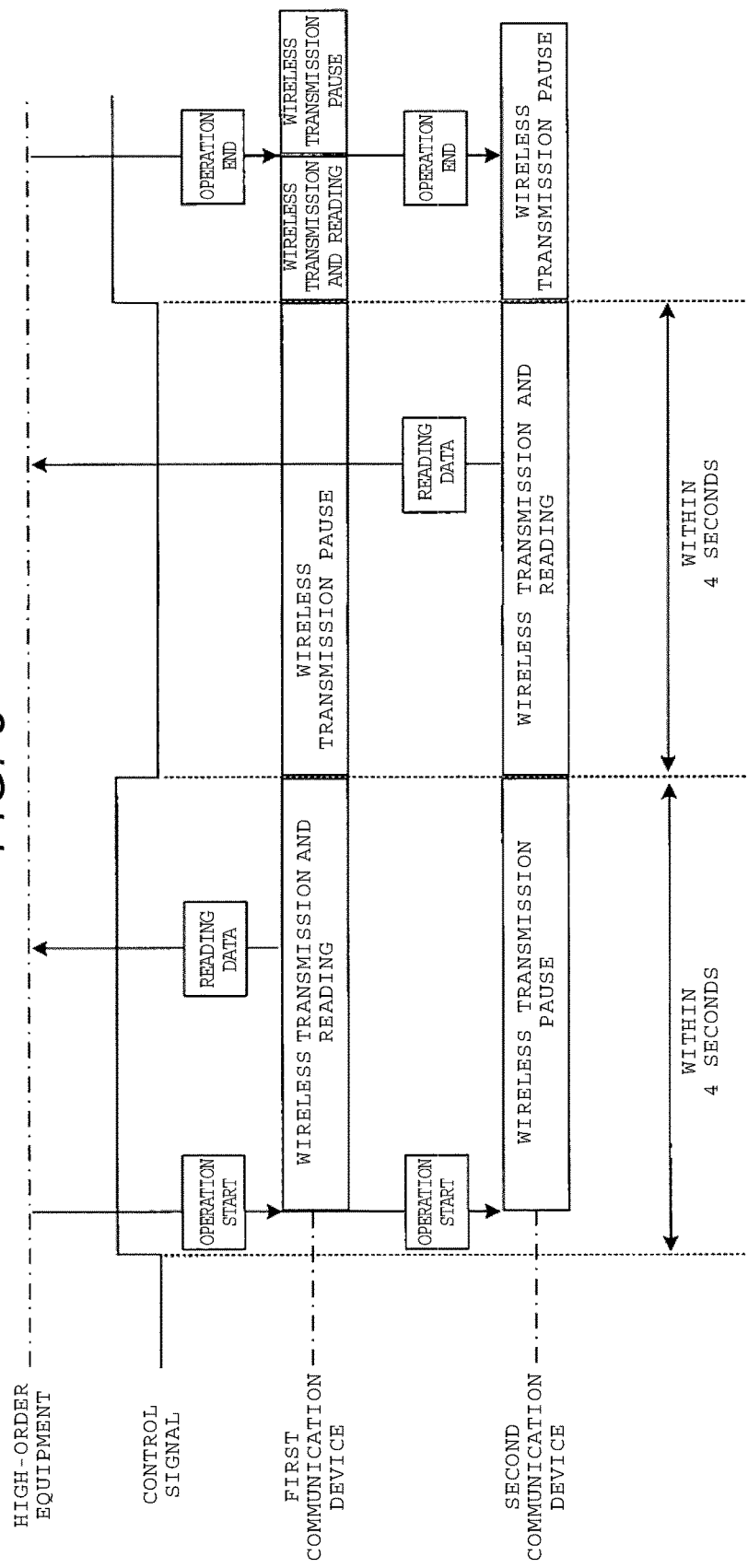
FIG. 5 is a diagram illustrating a communication sequence of the first embodiment.

FIG. 5 is a diagram illustrating a communication sequence of the first embodiment in which a horizontal direction is defined as a time axis. In the present example, a case where the first communication device 100A outputs the control signal and the second communication device 100B inputs the control signal is described.

The high-order equipment 200 gives an operation start instruction to the first communication device 100A and the second communication device 100B. The first communication device 100A and the second communication device 100B are connected to each other via the control signal line. When the control signal is at a high level (hereinafter, referred to as "H"), the first communication device 100A performs the wireless transmission and reading operation and the second communication device 100B stops the wireless transmission. Conversely, when the control signal is at a low level (hereinafter referred to as "L"), the second communication device 100B performs the wireless transmission and reading operations, and the first communication device 100A is in a pause state. In this embodiment, the control signal is output from the first communication device 100A.

The control unit 110 in the communication devices controls the wireless tag communication unit 120 such that the communication devices perform a reading operation or enter a pause state according to the above-described signal level. In addition, the control unit 110 of the first communication device 100A switches the level from H to L or from L to H within 4 seconds. In this embodiment, in consideration of the preparation of the reading operation or the like, switching is performed at a cycle of about 2 seconds.

As described above, the control unit 110 of the first communication device 100A switches the signal level such that one communication device pauses the operation at least 50 milliseconds or longer after the communication device performs a reading operation within a time period of 4 seconds. When switching is performed at a cycle of about 2 seconds, this requirement can be satisfied.

At an initial period when the operation start instruction is received from the high-order equipment 200, the first communication device 100A performs the reading operation and the second communication device 100B is in the pause state. In addition, at the initial period, the control signal is output at H. The first communication device 100A and the second communication device 100B output the read tag ID to the high-order equipment 200. When the operation end instruction is received from the high-order equipment 200, the first communication device 100A and the second communication device 100B are in the pause state regardless of the level of the control signal.

As illustrated in FIG. 5, since the pause states of the communication devices 100A and 100B are controlled so as not to overlap each other, the wireless tag TG is positioned in a region where the reading ranges of the first antenna 121A and the second antenna 121B overlap, so that the wireless tag TG is read by any one of the first communication device 100A and the second communication device 100B. In addition, since the reading operations do not overlap, interference or the like does not occur.

In the above example, the first communication device 100A outputs the signal and the control unit 110 of the first communication device 100A performs the synchronization control. However, the second communication device 100B may perform the synchronization control. That is, the control unit 110 of the second communication device 100B may control the output of the signal. In addition, both devices may output the signals. In this case, the control unit 110 of the first communication device 100A and the control unit 110 of the second communication device 100B function as one control unit.

By applying the first embodiment, the duplication of the pause period is avoided and the accuracy of reading can be improved. In addition, by adjusting the switching cycle, for example, the radio wave transmission can be paused for a minimum of 50 ms after the radio wave is transmitted for a maximum of 4 seconds.

Second Embodiment

In the first embodiment, the communication devices 100A and 100B perform the synchronization control by themselves. In a second embodiment, the high-order equipment 200 performs the synchronization control and the communication devices 100A and 100B perform the reading operation and the pause according to the instruction from the high-order equipment 200.

Figure 6:
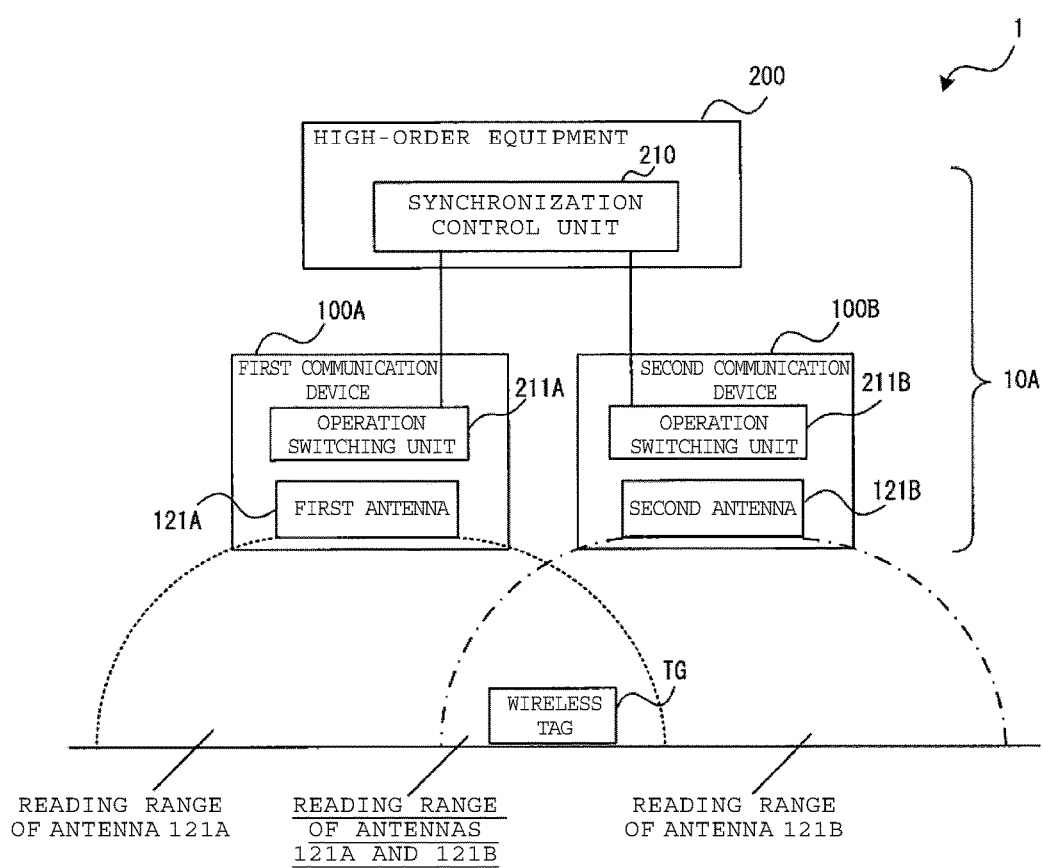
FIG. 6 is a diagram illustrating a wireless tag communication system according to a second embodiment.

FIG. 6 is a diagram illustrating a second embodiment. The high-order equipment 200 includes a synchronization control unit 210. The synchronization control unit 210 is a functional unit that transmits the reading start instruction and the reading end instruction to the communication devices 100A and 100B. The synchronization control unit 210 causes the processor 811 to execute a program stored in the storage unit 812 and is realized in cooperation with other hardware (for example, a communicator that communicates and controls the communication devices 100A and 100B) in the high-order equipment 200 based on the execution result.

In addition, the first communication device 100A includes an operation switching unit 211A and the second communication device 100B includes an operation switching unit 211B. The operation switching units 211A and 211B switch states between the reading operation and the pause according to the instruction from the synchronization control unit 210. By causing the processor 801 to execute the program stored in the storage unit 802, the operation switching units 211A and 211B are realized in hardware in the communication devices 100A and 100B.

In the second embodiment, a configuration which includes the first communication device 100A, the second communication device 100B, and the synchronization control unit 210 of the high-order equipment 200, in which the synchronization control unit 210 can communicate with each communication device, is referred to as a wireless tag communication apparatus 10A.

Figure 7:
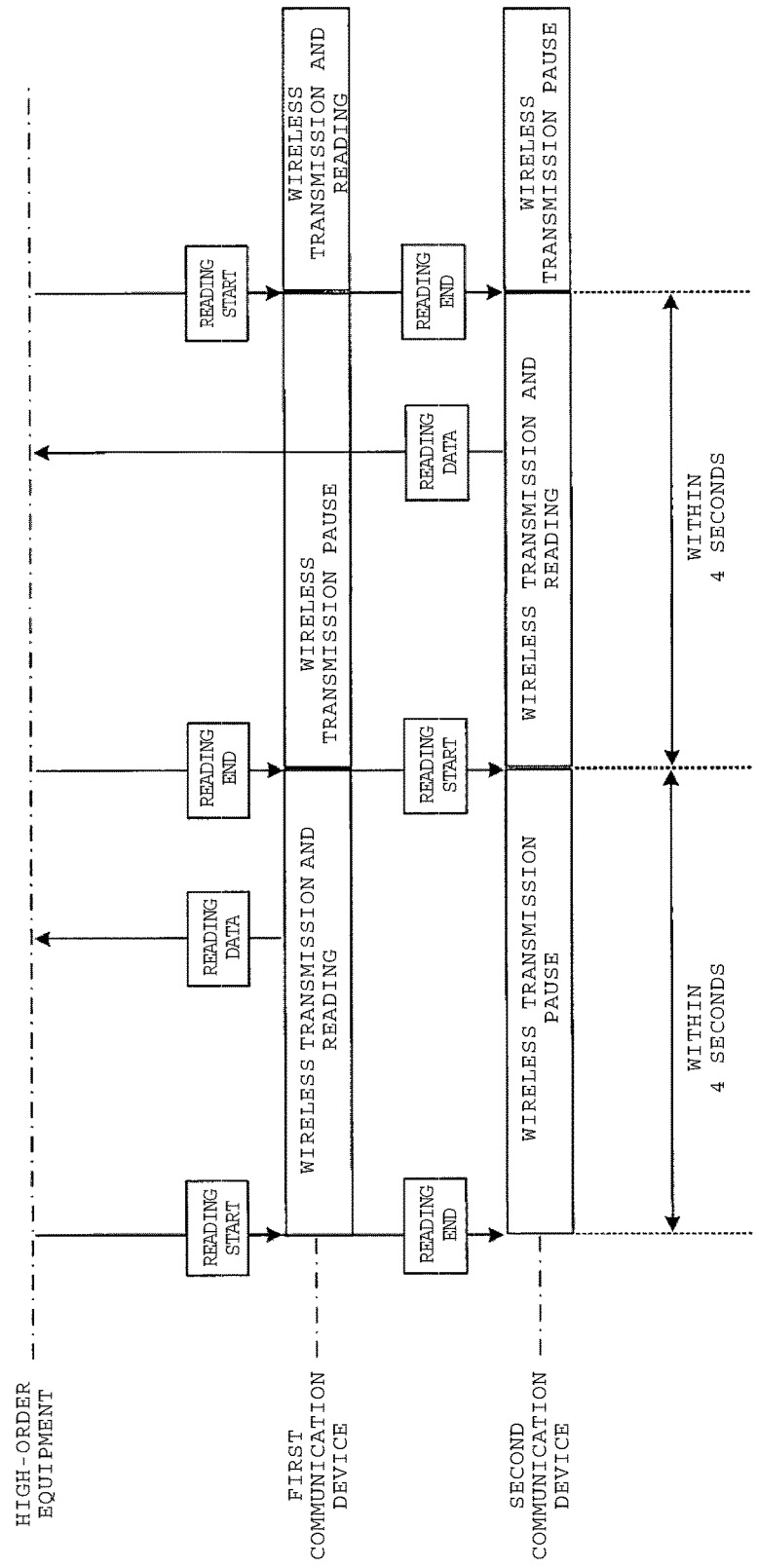
FIG. 7 is a diagram illustrating a communication sequence of the second embodiment.

FIG. 7 is a diagram illustrating an example of a communication sequence of the second embodiment. The synchronization control unit 210 of the high-order equipment 200 gives the reading start instruction to the first communication device 100A and gives the reading end instruction to the second communication device 100B at the same time. After the instructions are transmitted, the synchronization control unit 210 transmits the reading end instruction to the first communication device 100A within 4 seconds (for example, after 2 seconds elapsed) and outputs the reading start instruction to the second communication device 100B at the same time. In this manner, the synchronization control unit 210 gives the end instruction to the communication device performing the reading operation within 4 seconds, and gives the reading start instruction to the communication device which is in the pause state.

Current state flags of the communication devices 100A and 100B are stored in the storage unit 812 of the high-order equipment 200. The synchronization control unit 210 writes a value indicating states during the reading operation and during the pause state on a flag by itself. In addition, the synchronization control unit 210 transmits the instruction to the communication devices 100A and 100B based on the value on the state flag. The communication devices 100A and 100B, upon receiving the instruction, perform the reading start operation or the end operation according to the instruction.

The operation switching units 211A and 211B incorporate a module that receives the instruction or a module that controls the wireless tag communication unit 120 so as to perform the reading operation and the pause according to the instruction. By executing these modules, the processor 801 performs the reading operation and the pause according to the instruction from the synchronization control unit 210.

In the same manner as the first embodiment, the pause states of the communication devices 100A and 100B do not overlap each other in the second embodiment. Accordingly, the wireless tag TG in the region where the reading range of the first antenna 121A and the second antenna 121B overlaps is read by one of the first communication device 100A and the second communication device 100B. In addition, since the reading operations do not overlap, interference or the like does not occur.

Also in the second embodiment, the duplication of the pause period is avoided and the accuracy of reading can be improved. In addition, by adjusting the switching period, for example, to 2 seconds as described above, a request to pause the radio wave transmission for a minimum of 50 ms after the radio wave is transmitted for a maximum of 4 seconds can be satisfied.

Third Embodiment

In a third embodiment, one detailed example of controlling the switching operation between the communication devices is described below. Since the device configuration and the like are the same as that of the first embodiment, the description thereof is omitted.

Figure 8:
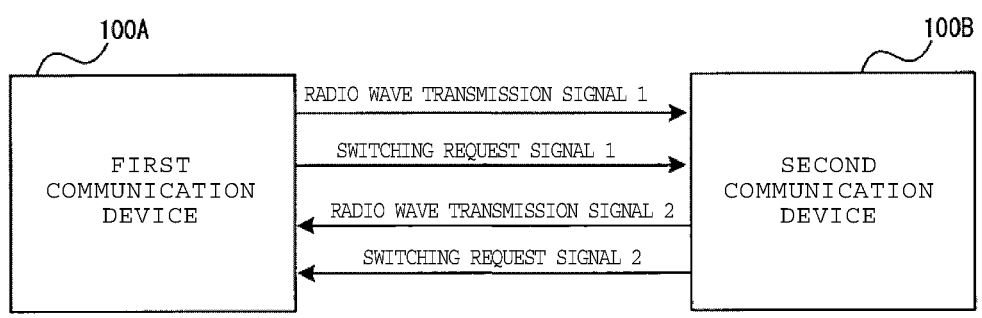
FIG. 8 is a diagram illustrating a signal to be input and output between first and second communication devices of a third embodiment.

FIG. 8 is a diagram illustrating a signal to be input and output between the first communication device 100A and the second communication device 100B. The first communication device 100A outputs a radio wave transmission signal 1 and outputs a switching request signal 1. The second communication device 100B receives these output signals. The second communication device 100B outputs a radio wave transmission signal 2 and outputs a switching request signal 2. The first communication device 100A receives these output signals.

Figure 9:
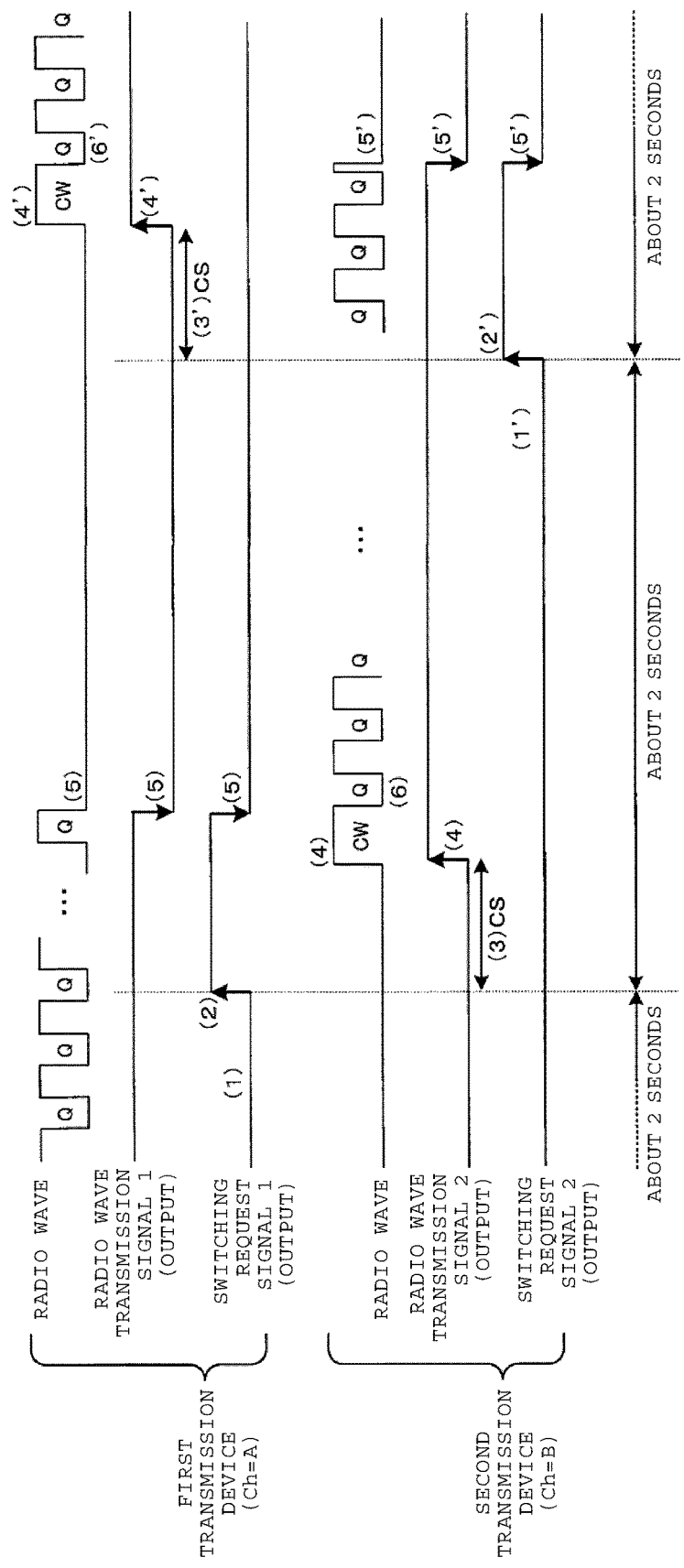
FIG. 9 is a diagram illustrating a timing chart of the third embodiment.

FIG. 9 is a diagram illustrating an example of a timing chart of the third embodiment in which the horizontal direction is defined as the time axis. FIG. 9 is a diagram illustrating a state where the first communication device 100A performs the reading operation by transmitting the radio wave (Query, indicated by "Q" in FIG. 9) while the second communication device 100B is paused and the radio wave is not output. The numbers in parentheses below correspond to the numbers in FIG. 9.

(1) Firstly, the first communication device 100A is in a state where the radio wave transmission signal 1 transmits Query (indicated by "Q" in the drawing) at H to read the wireless tag TG. For the purpose of simplifying the description, it is assumed that Query is transmitted at constant intervals. The first communication device 100A and second communication device 100B are in the pause state where the radio wave is not transmitted. Although not illustrated in the drawing, when Query is received, the wireless tag TG transmits a random number (RN16) and when ACK is received from the communication device, a returning movement of the tag ID is performed.

(2) When about 2 seconds are elapsed since previous switching, the first communication device 100A sets the switching request signal 1 to H. The switching request signal 1 is a signal indicating that the second communication device 100B may start outputting the radio wave of the non-modulated carrier (carrier wave, "CW" in the drawing).

(3) When it is detected that the switching request signal 1 attains a high level H, the second communication device 100B performs a carrier sense ("CS" in the drawing) for detecting whether an external station uses a channel (channel B, "ChB") to be used by the second communication device 100B.

(4) When it is detected that the channel B is empty, the second communication device 100B outputs a radio wave of the non-modulated carrier (CW) and sets the radio wave transmission signal 2 to H.

(5) When it is detected that the radio wave transmission signal 2 attains a high level H, the first communication device 100A sets a state where the second communication device 100B can output Query at any time and sets the radio wave transmission signal 1 and the switching request signal 1 to L. At the same time, the first communication device 100A stops the radio wave transmission and the Query transmission before the timing when the second communication device 100B outputs Query.

(6) When it is detected that the radio wave transmission signal 1 and the switching request signal 1 become L, the second communication device 100B starts the Query transmission. Accordingly, the radio wave transmission of the first communication device 100A is switched to the radio wave transmission of the second communication device 100B. The first communication device 100A is in the pause state and the second communication device 100B is in the reading operation.

By reversing the operations described in the above (1) to (6) by the first communication device 100A and the second communication device 100B, the operations (1) to (6) become operations (1') to (6') in the drawing. Hereinafter, it is described briefly.

(1') The second communication device 100B performs the reading operation of the wireless tag TG and the first communication device 100A is in the pause state.

(2') When about 2 seconds have elapsed since previous switching (in particular, when the switching request signal 1 became H), the second communication device 100B sets the switching request signal 2 to H.

(3') When it is detected that the switching request signal 2 attains a high level H, the first communication device 100A performs a carrier sense for detecting whether an external station uses a channel (Channel A, "ChA") to be used by the first communication device 100A.

(4') When it is detected that the channel A is empty, the first communication device 100A outputs a radio wave of the non-modulated carrier (CW) and sets the radio wave transmission signal 1 to H.

(5') When it is detected that the radio wave transmission signal 1 attains a high level H, the second communication device 100B stops the radio wave transmission and the Query transmission before the time when the first communication device 100A outputs Query. At the same time, the second communication device 100B sets the radio wave transmission signal 2 and the switching request signal 2 to L.

(6') When it is detected that the radio wave transmission signal 2 and the switching request signal 2 become L, the first communication device 100A starts the Query transmission. Accordingly, the operations are switched, and the second communication device 100B is in the pause state while the first communication device 100A is in the reading operation.

As described above, the device currently performing the reading operation outputs the switching request signal, and the device inputting the output signal is in the paused state and starts preparation for the reading operation. The preparation for the reading operation is an output of the carrier sense or an output of the non-modulated carrier, in this embodiment. Thereafter, the device performing the reading operation stops the reading operation and stops the output of the radio wave transmission signal and the switching request signal. The other device (a device that is in the pause state) detects the stopping of the output and starts the reading operation. In addition, the cycle of the output of the switching request signal is set to a cycle of 4 seconds or shorter. In this embodiment, in consideration of the preparation period, the cycle is set to a cycle of about 2 seconds.

Figure 10:
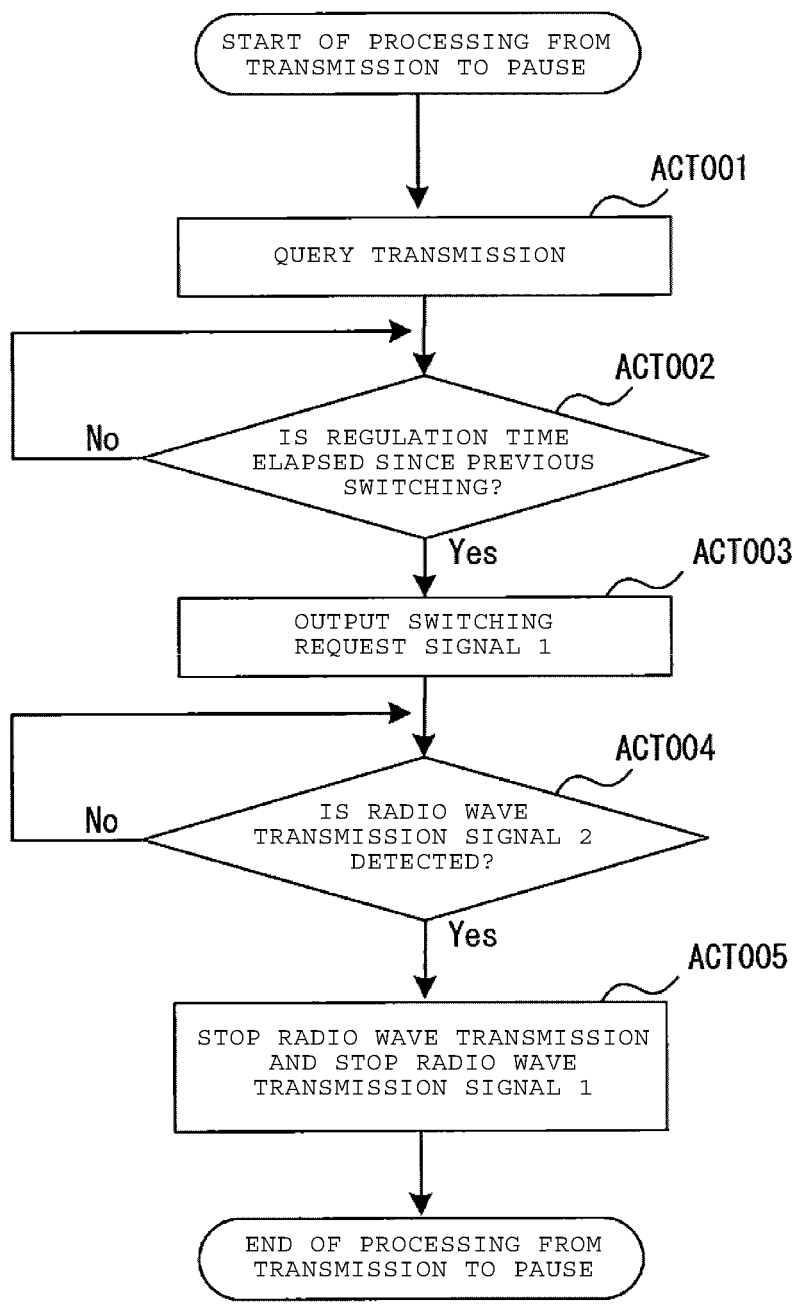
FIG. 10 is a flowchart illustrating an operation example from a reading operation to a pause operation of the third embodiment.
Figure 11:
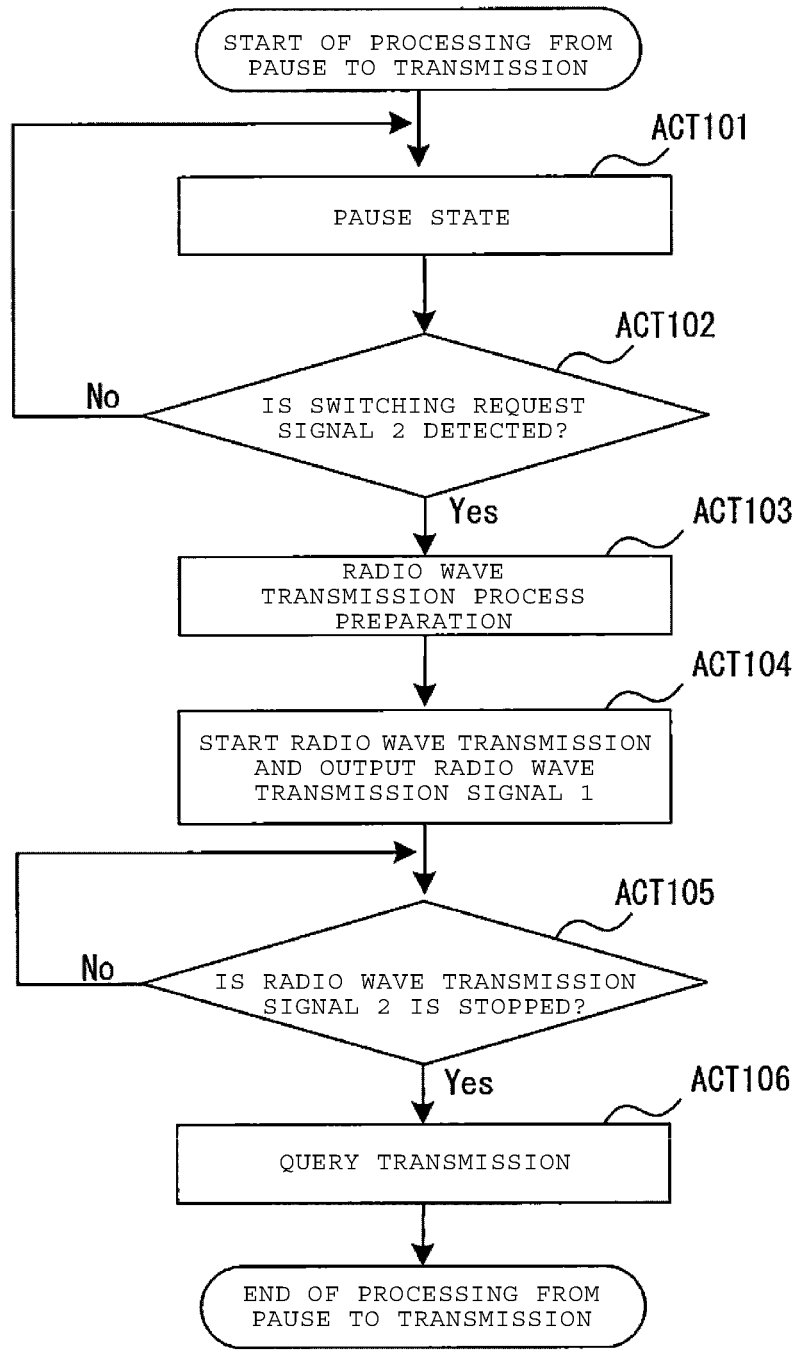
FIG. 11 is a flowchart illustrating an operation example from the pause operation to the reading operation of the third embodiment.

FIGS. 10 and 11 are flow charts illustrating a switching control between the reading operation and a pause state of the first communication device 100A. The switching control of the second communication device 100B also complies with the operations illustrated in FIGS. 10 and 11.

Firstly, an operation when the state is switched from the reading operation to the pause state of the first communication device 100A is described with reference to FIG. 10. The control unit 110 controls the wireless tag communication unit 120 to transmit Query (ACT001). The control unit 110 determines whether a regulation time (for example, 2 seconds) has elapsed since the previous switching (ACT002). When the regulation time has elapsed (ACT002-Yes), the control unit 110 controls the signal input and output unit 170 to switch the switching request signal 1 from L to H (ACT003). ACT001 and ACT002 are in a state corresponding to (1) in FIG. 9. In addition, ACT003 corresponds to (2) in FIG. 9. When it is detected that the switching request signal 1 is output, second communication device 100B starts the radio wave transmission process (corresponding to (3) in FIG. 9).

The control unit 110 determines whether the radio wave transmission signal 2 that is the output signal from the second communication device 100B is switched from L to H through the signal input and output unit 170 (ACT004). ACT004-Yes corresponds to (4) in FIG. 9.

The control unit 110 controls the wireless tag communication unit 120 to stop the radio wave transmission and the Query transmission and controls the signal input and output unit 170 to switch the radio wave transmission signal 1 from H to L (ACT005). At this time, the switching request signal 1 is switched from H to L. ACT005 corresponds to (5) in FIG. 9, and after ACT005, the first communication device 100A is in the pause state. When it is detected that the radio wave transmission signal 1 stops the output, the second communication device 100B starts the transmission of Query (corresponding to (6) in FIG. 9).

FIG. 11 is a flow chart illustrating an operation at the time of switching from the pause state to the reading operation of the first communication device 100A. The control unit 110 maintains the pause state until the switching request signal 2 is detected through the signal input and output unit 170 (a loop from ACT101 and ACT102-No to ACT101). When the switching request signal 2 is detected (ACT102-Yes), the control unit 110 starts the preparation of the radio wave transmission process (ACT103). Here, the carrier sense is performed. ACT101 corresponds to (1') and ACT102-Yes corresponds to (2') in FIG. 9. In addition, ACT103 corresponds to (3') in FIG. 9.

The control unit 110 controls the wireless tag communication unit 120 to output the non-modulated carrier (CW) and controls the signal input and output unit 170 to switch the radio wave transmission signal 1 from L to H (ACT104). ACT104 corresponds to (4') in FIG. 9.

The control unit 110 determines whether the radio wave transmission signal 2 is stopped (ACT105), and detects when the radio wave transmission signal 2 is stopped (ACT105-Yes). When the radio wave transmission signal 2 is stopped, the control unit 110 controls the wireless tag communication unit 120 to start the transmission of Query (ACT106). ACT105 corresponds to (5') and ACT106 corresponds to (6') in FIG. 9.

In the third embodiment, since both the devices output the signals and control to each other, the control unit 110 of the first communication device 100A and the control unit 110 of the second communication device 100B serve as one control unit.

By the above operations, the Query transmission between the first communication device 100A and the second communication device 100B does not overlap, and the reading and the pause are smoothly switched in the first communication device 100A and the second communication device 100B. Accordingly, the first communication device 100A and the second communication device 100B are not in the pause state at the same time, and wireless tag TG can be read at any time.

Fourth Embodiment

Figure 12:
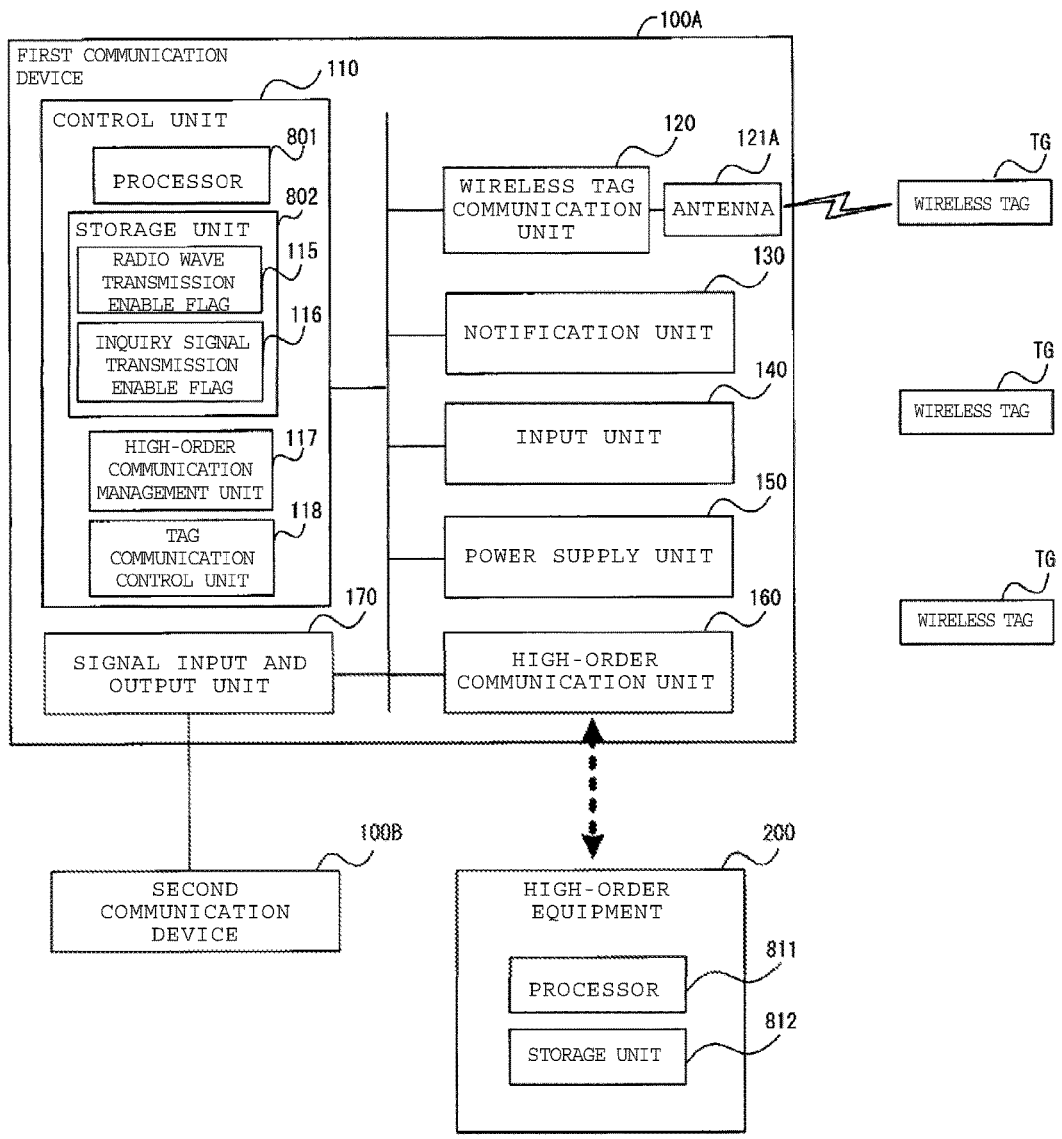
FIG. 12 is a diagram illustrating a first communication device according to a fourth embodiment.

In a fourth embodiment, the first communication device 100A and the second communication device 100B perform the switching operation in cooperation with the high-order equipment 200. FIG. 12 is a block diagram illustrating a configuration example of the first communication device 100A in the fourth embodiment. The first communication device 100A in FIG. 12 also includes the same configuration as that of the second communication device 100B. The first communication device 100A of the fourth embodiment stores two flags on the storage unit 802: a radio wave transmission enable flag 115 and an inquiry signal transmission enable flag 116. The communication devices 100A and 100B perform an input and output operation of signals to each other based on the flag values.

A high-order communication management unit 117 and a tag communication control unit 118 are units that cause the processor 801 to execute each program stored in the storage unit 802. The high-order communication management unit 117 rewrites values of the flags 115 and 116 based on the information to be transmitted from the high-order equipment 200. On the other hand, the high-order communication management unit 117 transmits the information to the high-order equipment 200 based on the values of the flags 115 and 116. The tag communication control unit 118 controls the operation of the wireless tag communication unit 120 based on the values of the flags 115 and 116. In addition, the tag communication control unit 118 also performs an operation that rewrites the values of the flags 115 and 116.

Since the other device configurations are the same as that of FIG. 3 described in the first exemplary embodiment, the description thereof is omitted.

Figure 13:
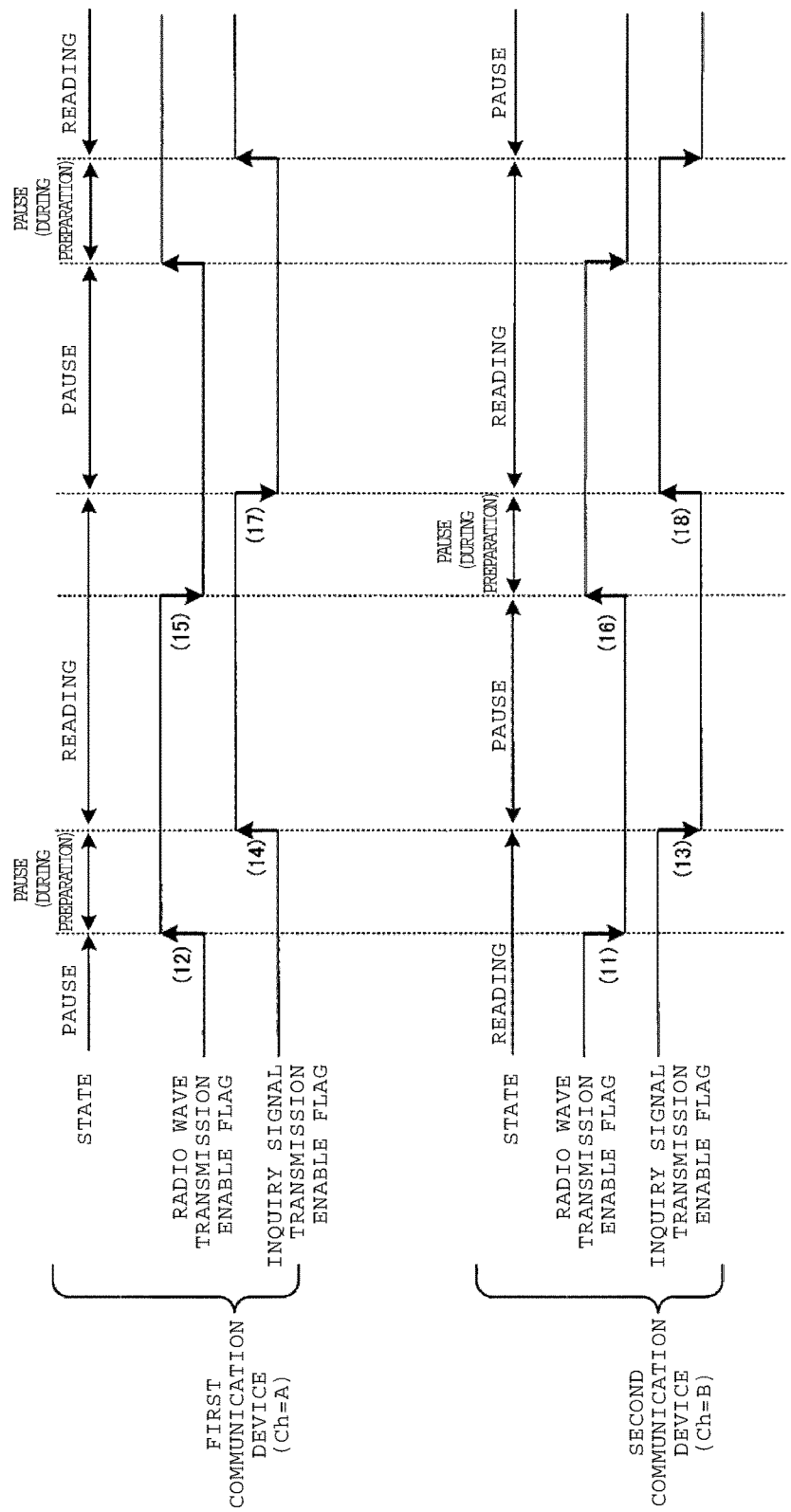
FIG. 13 is a timing chart illustrating a corresponding example between each of the pause states and operation states and flags used in the fourth embodiment.

FIG. 13 is a diagram illustrating the states of the pause and reading operation and the switching of the values of the flags 115 and 116 in which the horizontal direction is defined as the time axis. The switching operation of the fourth embodiment is described with reference to FIG. 13. An initial state of FIG. 13 is a state where the first communication device 100A is in the pause state, and is read by the second communication device 100B. In addition, the numbers in parentheses below correspond to the numbers in FIG. 13.

(11) When the regulation time (for example, 2 seconds) elapses from the start of the reading operation, the tag communication control unit 118 of the second communication device 100B rewrites the radio wave transmission enable flag 115 from H to L. In the present example, the levels are denoted as H and L. The levels may be any identifiable symbol and may be denoted as 1 and 0. The high-order communication unit 160 of the second communication device 100B notifies the high-order equipment 200 that the radio wave transmission enable flag 115 is switched from H to L.

(12) When the information that the switching request is transmitted from the second communication device 100B through the high-order equipment 200 is obtained, the high-order communication unit 160 of the first communication device 100A switches the radio wave transmission enable flag 115 from L to H. The tag communication control unit 118 of the first communication device 100A detects that the radio wave transmission enable flag 115 is switched and controls the wireless tag communication unit 120 to perform the carrier sense (CS). The tag communication control unit 118 confirms that the channel (for example, ChA) to be used by the first communication device 100A is not used by the other station and transmits the non-modulated carrier (CW). The operation is a preparation ("DURING PREPARATION" in the drawing) of the reading operation in this example.

(13) The tag communication control unit 118 of the second communication device 100B rewrites the inquiry signal transmission enable flag 116 from H to L. The switching is performed based on whether the elapsed time reaches a regulation time (for example, 1 second) after the radio wave transmission enable flag 115 is switched. The tag communication control unit 118 of the second communication device 100B controls the wireless tag communication unit 120 in which the Query transmission is ended to stop the reading operation. The end timing of the Query transmission may be slightly delayed and ended for the purpose of switching normally. On the other hand, the high-order communication management unit 117 of the second communication device 100B detects that the inquiry signal transmission enable flag 116 is switched from H to L and transmits the information (hereinafter, inquiry transmission end information) indicating that the Query transmission is ended to the high-order equipment 200. Accordingly, the second communication device 100B enters the pause state.

(14) When the radio wave transmission end information of the second communication device 100B is received from the high-order equipment 200 through the high-order communication unit 160, the high-order communication management unit 117 of the first communication device 100A switches the inquiry signal transmission enable flag 116 from L to H. The tag communication control unit 118 of the first communication device 100A detects that the inquiry signal transmission enable flag 116 has switched from L to H, and controls the wireless tag communication unit 120 so as to start the Query transmission. Accordingly, the first communication device 100A starts the reading operation.

The steps (15) to (18) in the drawing are obtained by reversing the above operations (11) to (14) of the first communication device 100A and the second communication device 100B.

(15) When the regulation time (for example, 2 seconds) has elapsed since the transmission of Query is started, the first communication device 100A transmits the switching request to the high-order equipment 200 and rewrites the radio wave transmission enable flag 115 from H to L.

(16) When the information that the switching request was transmitted from the first communication device 100A through the high-order equipment 200 is obtained, the second communication device 100B switches the radio wave transmission enable flag 115 from L to H. At the same time, when the second communication device 100B prepares reading and performs the carrier sense (CS) to confirm that the channel (for example, ChB) to be used by the second communication device 100B is not used by the other station, the non-modulated carrier (CW) is transmitted.

(17) The first communication device 100A transmits the inquiry transmission end information to the high-order equipment 200 and rewrites the radio wave transmission enable flag 115 from H to L. Accordingly, the first communication device 100A enters the pause state.

(18) When the radio wave transmission end information of the first communication device 100A is received from the high-order equipment 200, the second communication device 100B switches the inquiry signal transmission enable flag 116 from L to H to start the Query transmission. Accordingly, the second communication device 100B starts the reading operation.

By repeating the above operations (11) to (18), the reading operation between the first communication device 100A and the second communication device 100B does not overlap and the reading and pause operations are smoothly switched. Accordingly, the first communication device 100A and the second communication device 100B are prevented from being paused at the same time, and the wireless tag can be read at any time. In addition, by controlling such that the reading operation does not overlap, it is possible to suppress interference or the like.

In this manner, two flags of the radio wave transmission, enable flag 115 and the inquiry signal transmission enable flag 116, are used as a common unit of data between the modules of the high-order communication management unit 117 and the tag communication control unit 118 and are used as a state notification unit.

In an embodiment, the radio wave transmission enable flag 115 and the inquiry signal transmission enable flag 116 are switched by the wireless tag communication devices 100A and 100B. However, in another embodiment high-order equipment transmits the data used for performing a flag rewriting through the communication unit of the high-order equipment.

In addition, when the frequency channels (ChA and ChB) of the first communication device 100A and the second communication device 100B are different channels, the radio wave interference can be reduced and a more stable reading of the wireless tag can be performed.

The above-described embodiments may be combined.

In the above-described embodiments, the signal levels of H and L may be reversed.

Figure 14:
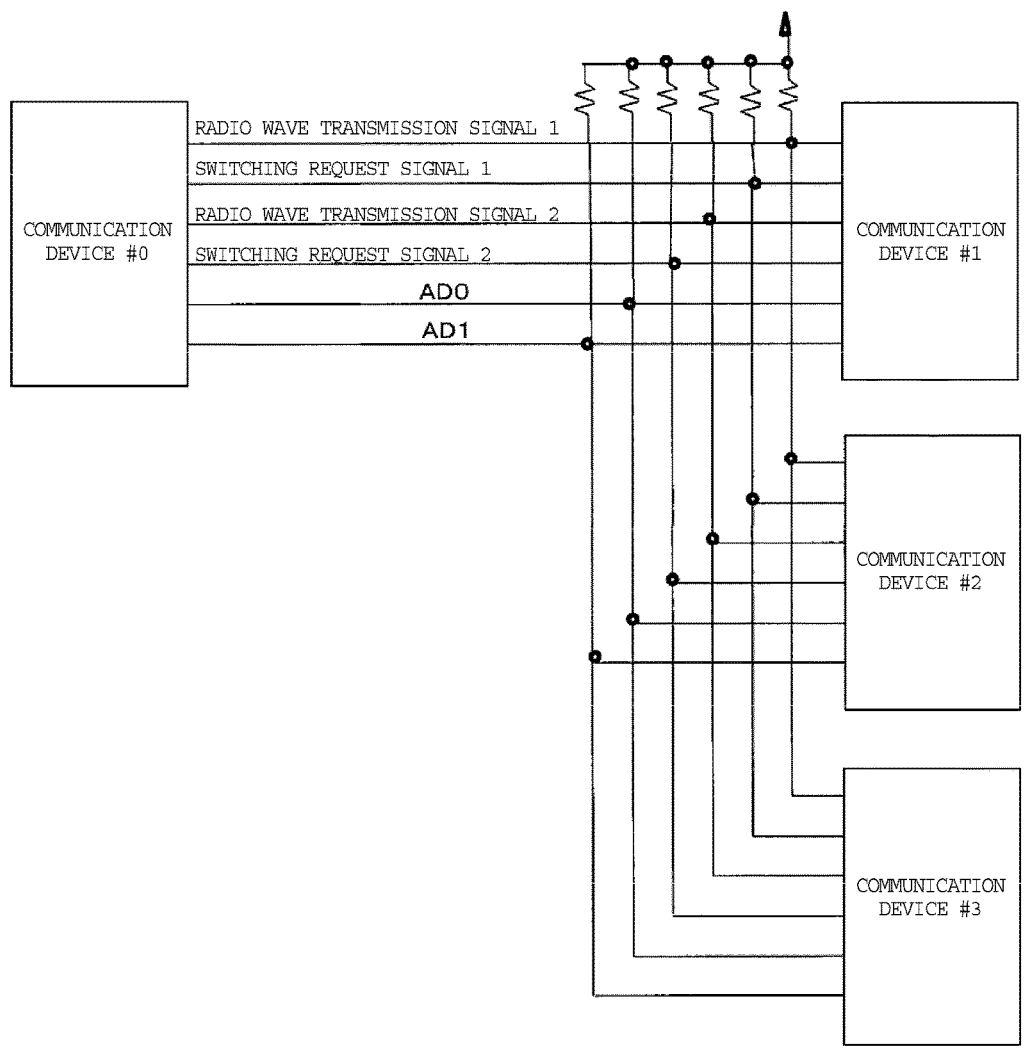
FIG. 14 is a diagram illustrating signals when three or more communication devices are configured according to an embodiment.

In the above-described embodiments, the maximum value of the radio wave transmission time in one communication device is set to 4 seconds or shorter and the switching operation is controlled such that the communication device is paused for at least 50 milliseconds or longer. Accordingly, it is possible to satisfy a low electric power restriction, and it is possible to read the wireless tag while outdoors or moving. In the above-described embodiments, the operations are switched each 2 seconds as an example. The switching cycle satisfies the standard low electric power restriction. The time is set to 2 seconds in this embodiment, but may be set to other values in other embodiments In the above-described embodiments, a case of two communication devices is described. However, three or more communication devices can be applied. In FIG. 14, for example, six signals are connected to the communication device. The six signals are pulled up by a resistor and the communication devices can set the signals to H or L by an open collector or an open drain. For example, when a communication device #0 reads the wireless tag, similarly to FIG. 8, the radio wave transmission signal 1 and the switching request signal 1 are output by the communication device #0. AD0 and AD1 are addresses of the communication device of the switching request destination. For example, when AD0 is L and AD1 is H, the communication device #0 outputs the switching request to a communication device #2. Accordingly, the communication device #2 outputs the radio wave transmission signal 2. The switching operation is the same as that of FIG. 8. When the reading operation is switched to the communication device #2, the radio wave transmission signal 1 and the switching request signal 1 are output by the communication device #2, as described above. Thereafter, similarly, the switching operation can be performed. The switching order may be determined in advance. The number of the signal lines is six. However, in this example, the switching request signal 2 may not be required.

In addition to the above description, when the number of the communication devices is three or more, it is possible to use the flag information that enables the high-order equipment to express a plurality of values and control the reading operation and the pause operation of the plurality of communication devices according to the flag value.

When three or more communication devices are used and one device is in the reading state, all the other communication devices may be in the pause state. In addition, when interference problems are solved, a plurality of communication devices can perform the reading operation and other communication devices during this period can be in the pause state. In addition, when three or more communication devices are used, the communication devices are disposed such that a common reading range where all the devices can perform reading is provided and at least a part of the reading ranges overlap each other. The wireless tag is positioned within the common reading range.

In the present embodiment, the plurality of wireless tag communication apparatuses repeatedly performs the pause and reading operations at the same cycle. In the above description, as an example, a case where the operation is paused for 2 seconds after operating for 2 seconds is described. However, in another embodiment a control is performed such that the communication devices switch at the same cycle while synchronizing the communication devices, such as a case where the operation is paused for 1 second after operating for 3 seconds, or the operation is paused for 1.5 seconds after operating for 2.5 seconds. The communication devices switch at the same cycle, whereas the total operation times can also be matched for each communication device. By matching the total operation times for each communication device, and since the degree of deterioration in the communication devices is similar, the repair periods or the switching periods become almost the same periods in the communication devices. Accordingly, suitable operation can be performed.

On the other hand, there is a case where among the channels which are used by two communication devices, one channel is empty and the other channel is non-empty because the external station uses the other channel. In the communication device using the non-empty channel, since the communication is not easily performed, a gap in the usage frequency of the communication devices occurs depending on the empty or non-empty channel. In such a situation, since the gap in the usage frequency is eliminated, it is possible to implement a different reading operation time. That is, it can be implemented that the time of the reading operation (operation time) is shortened for the communication device using the empty channel, and the time of the reading operation is lengthened for the communication device in which the non-empty state frequently occurs. In this case, the history data of the carrier sense are collected, the use state of the channel is checked based on the history, and the time of the reading operation is adjusted. This adjustment may be performed by the user (maintenance person) and may be implemented independently by the device side.

The "communication" in the present embodiment means a state where signals or data can be exchanged and means exchanging of a request and a response between the communication device and the wireless tag. In addition, a series of operations from the communication device outputting Query, or the wireless tag outputting the information in the tag until the communication device receives the output information may be regarded as the communication. In addition, a state where the carrier sense is being performed or a state where the non-modulated carrier is output is not handled as the communication in the present embodiment. In any one of the states or in both the states, the communication may be performed.

In the present embodiment, a case focusing mainly on the communication device which operates reading the wireless tag is described. However, the embodiments can also be applied to the operation in which the communication device writes data to the wireless tag. That is, the communication includes not only the operation of reading from the wireless tag but also the operation of writing to the wireless tag.

In one embodiment, a case where the function for implementing an exemplary embodiment is recorded in the device in advance is described. However, it is not limited thereto, and the same function may be downloaded to the device through a network or a function stored in a recording medium may be installed on the device. For the recording medium, any form may be used as long as the recording medium is a recording medium which can store a program such as CD-ROM and which can be read by the device. In addition, the function which is obtained by installing or downloading in advance as described above may realize the function by cooperating with an operating system (OS) or the like inside the device.

As described above, in the embodiment, even when a pause time of the radio wave transmission is provided in the communication unit, the wireless tag can be read and the communication reliability can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication apparatus comprising:
a plurality of communication devices each configured to communicate with a wireless tag and disposed such that communicable ranges of the communication devices overlap each other; and
a controller configured to control each of the plurality of communication devices to alternate between a communication state and a pause state, wherein when the wireless tag is positioned within communication ranges of both first and second communication devices of the plurality of communication devices, the controller controls each of the first and second communication devices to alternate between the communication state and the pause state such that the first communication device and the second communication device are not both in the communication state concurrently and are not both in the pause state concurrently when the wireless tag is positioned within communication ranges of both first and second communication devices.

2. The apparatus according to claim 1,
wherein the controller controls a third communication device to be in the pause state while one of the first or the second communication devices communicates with the wireless tag; and
wherein the first and the second communication devices are in the pause state while the third communication device communicates with the wireless tag.

3. The apparatus according to claim 1,
wherein the first communication device receives a wireless tag identification (ID) from the wireless tag and determines the location of the wireless tag based on the wireless tag ID.

4. The apparatus according to claim 3, wherein the first communication device stores the wireless tag ID in a database.

5. The apparatus according to claim 1,
wherein the plurality of communication devices are disposed on a moving object and communicate with a plurality of wireless tags disposed along a traveling direction of the moving object.

6. The apparatus according to claim 1, wherein the controller controls each of the plurality of communication devices to communicate for a period less than 4 seconds and then pause for at least 50 milliseconds.

7. The apparatus according to claim 1, further comprising a control signal line that couples the first communication device to the second communication device, wherein the first and second communication devices are placed into the communication state or the pause state based on a signal on the control signal line.

8. A wireless tag communication system comprising:
a plurality of communication devices disposed on a moving object and disposed such that communicable ranges of the communication devices overlap each other, wherein the communication devices each communicate with a wireless tag;
a controller which controls each of the plurality of communication devices to alternate between a communication state and a pause state, wherein when the wireless tag is positioned within the communication ranges of both first and second communication devices of the plurality of communication devices, the controller controls each of the first and second communication devices to alternate between the communication state and the pause state such that the first communication device and the second communication device are not both in the communication state concurrently and are not both in the pause state concurrently when the wireless tag is positioned within communication ranges of both first and second communication devices; and
a plurality of wireless tags which are disposed along a traveling direction of the moving object.

9. The system according to claim 8,
wherein the controller controls a third communication device to be in the pause state while one of the first or the second communication devices communicates with the wireless tag; and
wherein the first and the second communication devices are in the pause state while the third communication device communicates with the wireless tag.

10. The system according to claim 8,
wherein the controller controls each of the plurality of communication devices to communicate for a period less than 4 seconds and then pause for at least 50 milliseconds.

11. The system according to claim 8,
wherein the first communication device receives a wireless tag identification (ID) from the wireless tag and determines the location of the wireless tag based on the wireless tag ID.

12. The system according to claim 11, wherein the first communication device stores the wireless tag ID in a database.

13. The system according to claim 8, further comprising a control signal line that couples the first communication device to the second communication device, wherein the first and second communication devices are placed into the communication state or the pause state based on a signal on the control signal line.

14. A method of communicating between a wireless tag and a plurality of communication devices, the communication devices disposed such that communicable ranges of the communication devices overlap each other, the method comprising:
alternating each of the plurality of communication devices between a communication state and a pause state; and
when the wireless tag is positioned within communication ranges of both first and second communication devices of the plurality of communication devices, controlling each of the first and second communication devices to alternate between the communication state and the pause state such that the first communication device and the second communication device are not both in the communication state concurrently and are not both in the pause state concurrently when the wireless tag is positioned within communication ranges of both first and second communication devices.

15. The method of claim 14, further comprising:
receiving a wireless tag identification (ID) from the wireless tag at the first communication device and determining the location of the wireless tag based on the wireless tag ID.

16. The method of claim 15, further comprising:
storing the wireless tag ID in a database at the first communication device.

17. The method of claim 14, wherein the plurality of communication devices are disposed on a moving object and communicate with a plurality of wireless tags disposed along a traveling direction of the moving object.

18. The method of claim 14, wherein a controller controls each of the plurality of communication devices to communicate for a period less than 4 seconds and pause for at least 50 milliseconds.

* * * * *